April 23, 1963   W. E. GELLNER   3,086,598
IMPLEMENT AND TRANSPORT THEREFOR
Filed Jan. 22, 1962   4 Sheets-Sheet 1

INVENTOR.
WALTER E. GELLNER
BY
Merchant, Merchant & Gould
ATTORNEYS

April 23, 1963 W. E. GELLNER 3,086,598
IMPLEMENT AND TRANSPORT THEREFOR
Filed Jan. 22, 1962 4 Sheets-Sheet 2

INVENTOR.
WALTER E. GELLNER
BY
ATTORNEYS

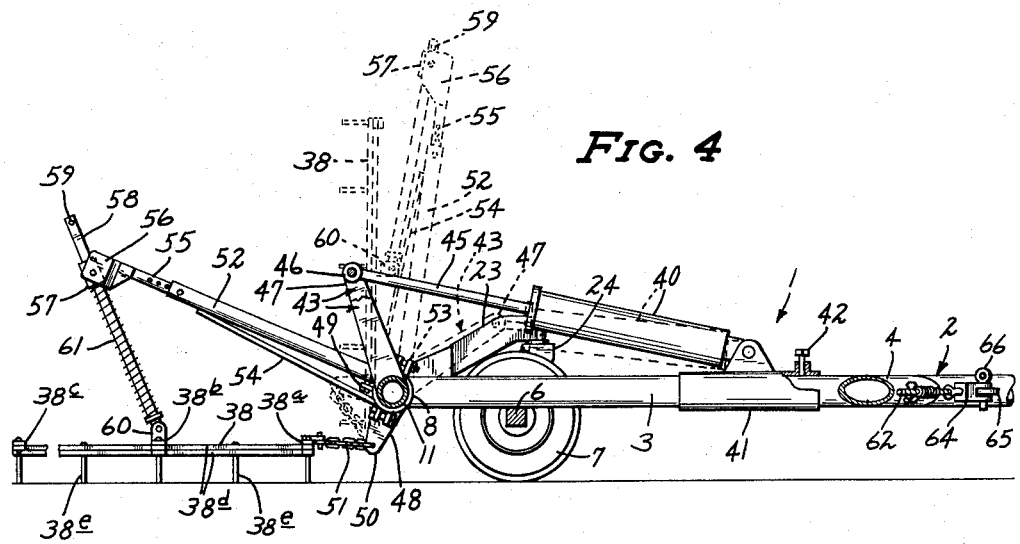
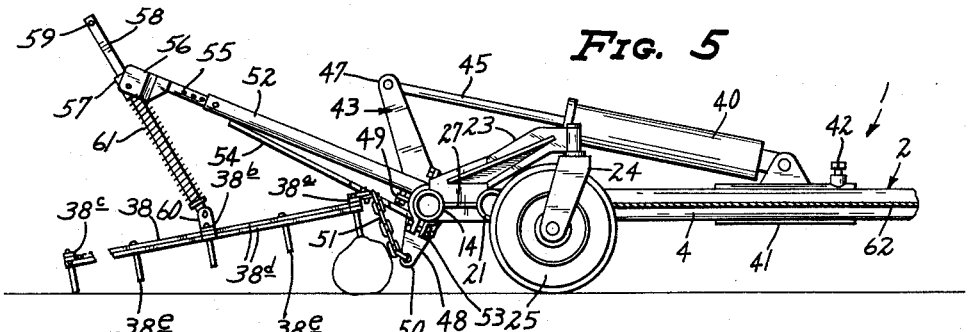
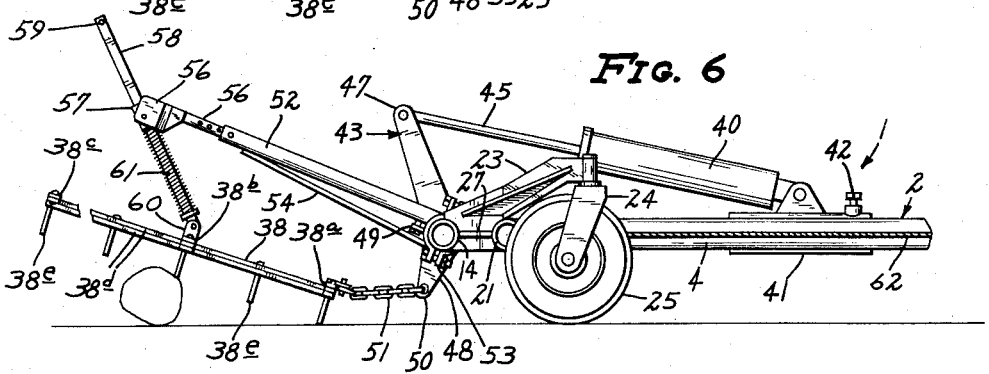

April 23, 1963  W. E. GELLNER  3,086,598
IMPLEMENT AND TRANSPORT THEREFOR
Filed Jan. 22, 1962  4 Sheets-Sheet 4

INVENTOR.
WALTER E. GELLNER
BY
Merchant, Merchant & Gould
ATTORNEYS

United States Patent Office 3,086,598
Patented Apr. 23, 1963

3,086,598
IMPLEMENT AND TRANSPORT THEREFOR
Walter E. Gellner, Langdon, N. Dak.
Filed Jan. 22, 1962, Ser. No. 167,731
6 Claims. (Cl. 172—456)

This invention relates generally to agricultural equipment and machinery, and more particularly it relates to an improved implement and transport therefor of the general type adapted to support relatively wide implement extensions and also adapted to fold the same for transportation.

Implements and transports of the general class described above have previously been adapted to carry ground-working agricultural implements (an example being a harrow) of a substantially greater transverse dimension than that of the towing vehicle, and the use of the above described type of implements and transports becomes particularly advantageous when several of the implements can be connected in transverse side-by-side relationship whereby to greatly increase the ground coverage of the implement with each succeeding pass of the towing vehicle. However, previously known types of implement transports of the class described above have usually been designed and constructed so as to require relatively heavy and expensive structure to adequately support the same and also require a relatively great amount of power to move the same between the extended operative position and the folded or collapsed transporting position and also to move the implement sections from their ground-working positions to the raised transporting positions thereof. As compared therewith, an object of this invention is the provision of an implement transport which is free from the above mentioned objections and which is extremely efficient in its operation.

Another object of this invention is the provision of an implement and transport therefor wherein the opposite end sections thereof are pivotally connected to the center section for swinging movements between operative positions in alignment with the center section and inoperative trailing positions extending rearwardly of the center section.

Another object of this invention is the provision of an implement and transport therefor in which the end sections thereof have ground-engaging wheels at their outer end portions whereby to permit the end sections to move upwardly and downwardly so as to enable the implement transport to move effectively over uneven ground without regard to the positions of the implements carried thereby or without regard to the relative positions between the opposite end sections and the center section thereof.

A still further object of this invention is the provision of an implement and transport therefor which is provided with means for exerting downward pressure on the harrow sections and also with means for exerting a generally straight forward pull upon the forward portions of the harrow sections whereby to insure that the implement sections act in the desired manner in working the earth but which also permits the implement sections to raise so as to allow the passage of obstructions thereby.

A still further object of this invention is the provision of an implement and transport therefor which can be controlled and adjusted so as to effectively work the earth when the same is in various conditions of mellowness or hardness.

Other objects of this invention reside in the provision of an implement and transport therefor which may be relatively economically manufactured and assembled since the same is designed and constructed with a minimum of working parts, which is relatively easy to operate between its various positions, which is durable and strong in construction, and which is extremely efficient in its operation.

The foregoing and other objects and advantages of this invention will become apparent from the following detailed specification, appended claims and attached drawings.

Referring to the drawings, wherein like reference characters indicate like parts or elements throughout the several views:

FIG. 4 is an enlarged view in section taken substantially on the line 4—4 of FIG. 1, some parts being broken away;

FIG. 5 is an enlarged view in end elevation as seen from left to right of FIG. 2, and showing some parts thereof in an alternative position;

FIG. 6 is a view corresponding to FIG. 5, but showing some parts thereof in another position;

Figure 1:
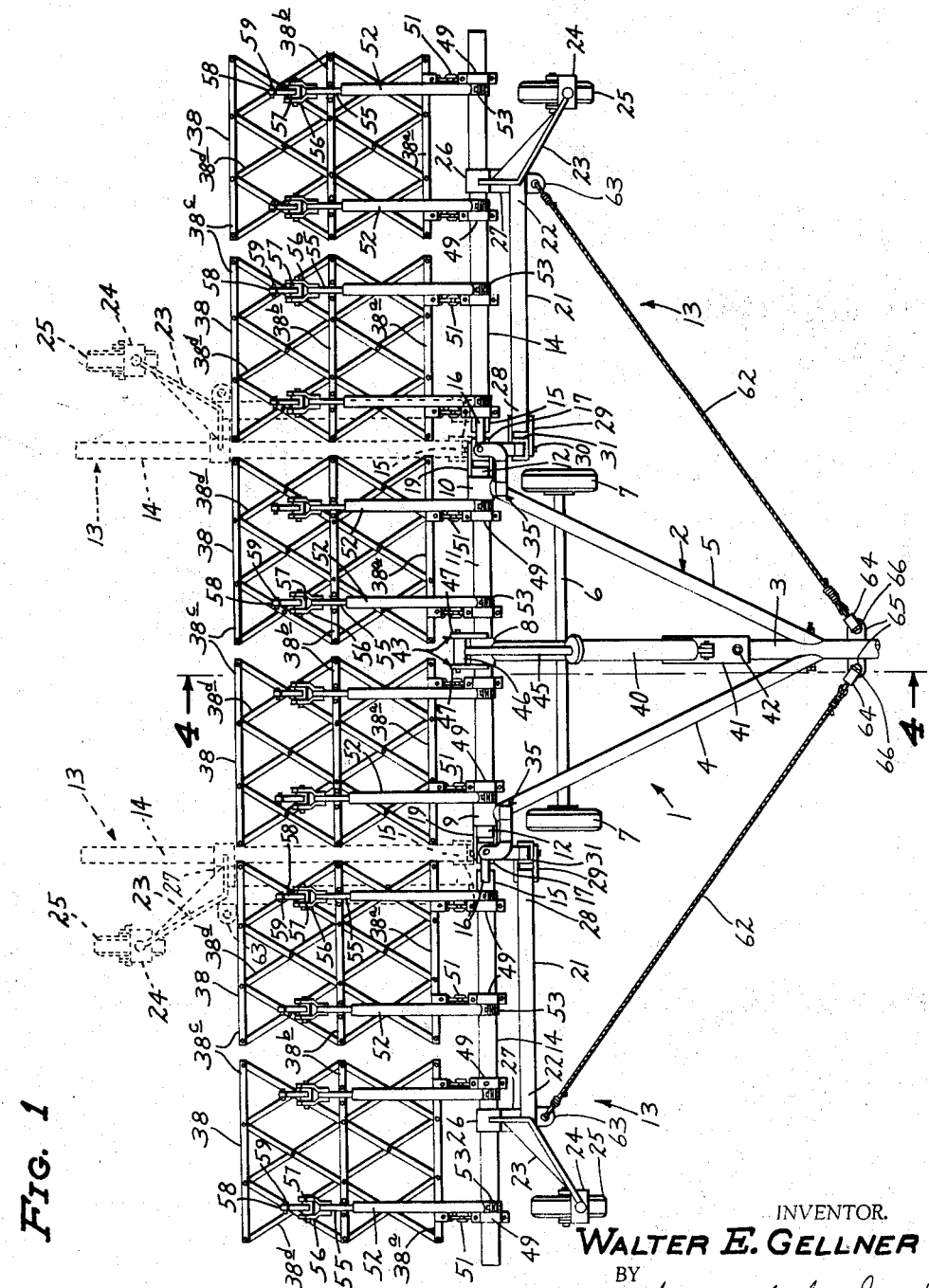
FIG. 1 is a view in top plan of this invention, alternative positions of some parts thereof being shown by dotted lines.

Referring again for descriptive purposes to the drawings, the implement and transport therefor which comprises this invention is adapted for use in combination with a towing vehicle, not shown. The implement transport comprises a center section, represented in its entirety by the reference numeral 1. The center section 1 includes rigid frame structure 2, the same comprising a tubular center frame member 3, and tubular angularly disposed side frame members 4, 5 rigidly secured at their forward end portions to the center member 3 and extending laterally outwardly and rearwardly therefrom, as shown particularly in FIG. 1. The forward end portion, not shown, of the center frame member 3 is adapted for connection by conventional means to the towing vehicle, not shown. The center section 1 of the implement and transport, as shown, is provided with wheel carriage means disposed generally intermediate the forward portion and the rearward portion of the frame structure 2 and comprising an elongated transverse axle 6 rigidly secured beneath the center frame member 3 and the side frame members 4, 5. As shown in FIG. 1, the opposite ends of the transverse axle 6 are provided with suitable wheels 7.

In accordance with this invention, the rearward end portion of the center frame member 3 is provided with a rigidly secured bearing sleeve 8 and the rearward end portions of the side frame members 4, 5 are similarly each provided with rigidly secured bearing sleeves 9, 10 respectively. The bearing sleeves 8—10 are disposed in generally co-axial relationship with the axes thereof extending generally transversely with respect to the normal direction of travel of the towing vehicle and the implement transport. The bearing sleeves 8—10 provide bearing means for mounting and journalling an elongated generally horizontally extending implement-carrying shaft 11 rotatable about its own axis. The shaft 11 is disposed with its opposite end portions 12 disposed outwardly of the bearing sleeves 8—10.

Figures 2, 3:
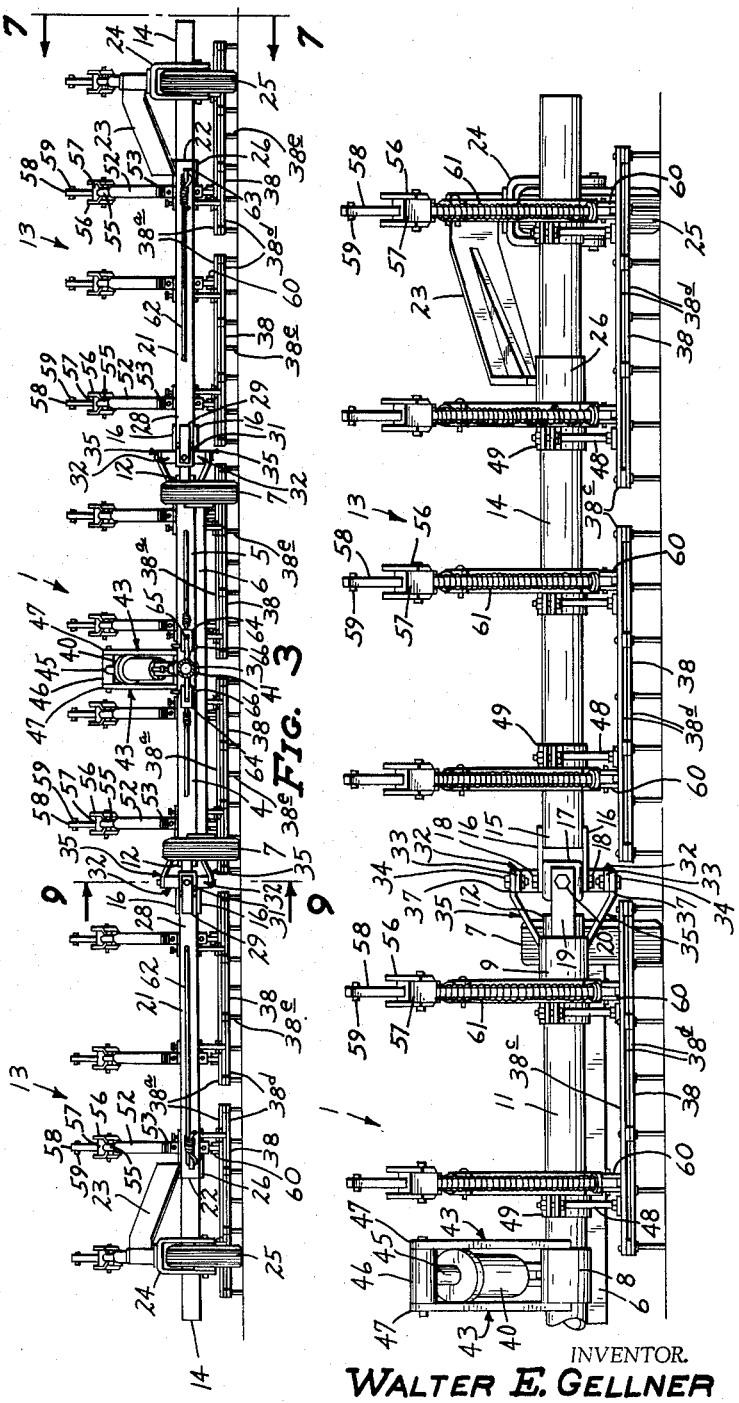
FIG. 2 is a view in front elevation.
FIG. 3 is an enlarged fragmentary view in rear elevation.
Figure 7:
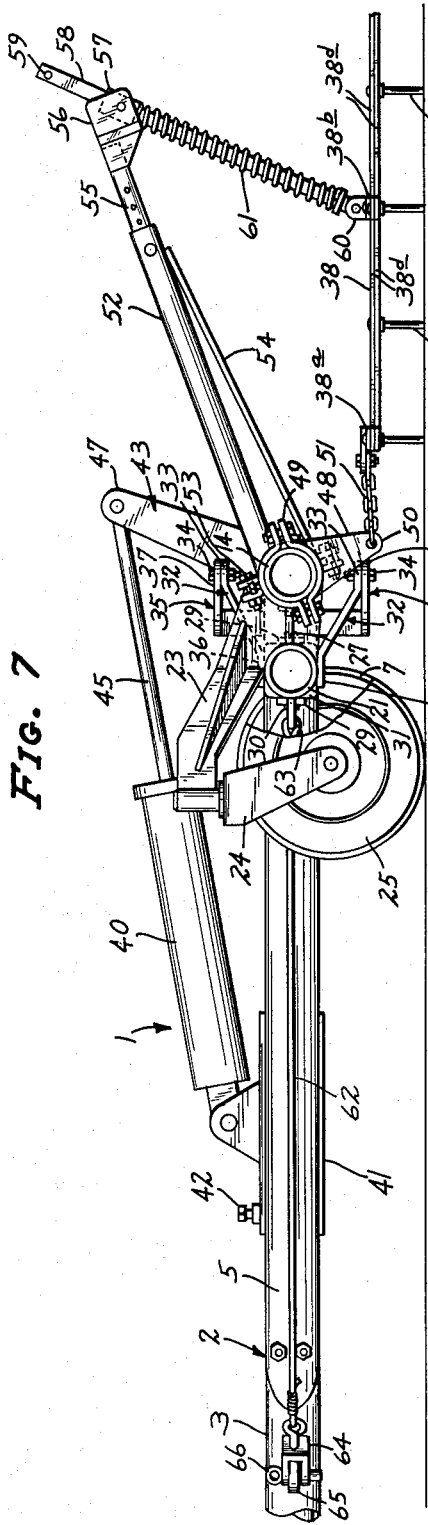
FIG. 7 is a further enlarged view in end elevation as seen from right to left of FIG. 2, as indicated by the line 7—7 of FIG. 2.
Figure 9:
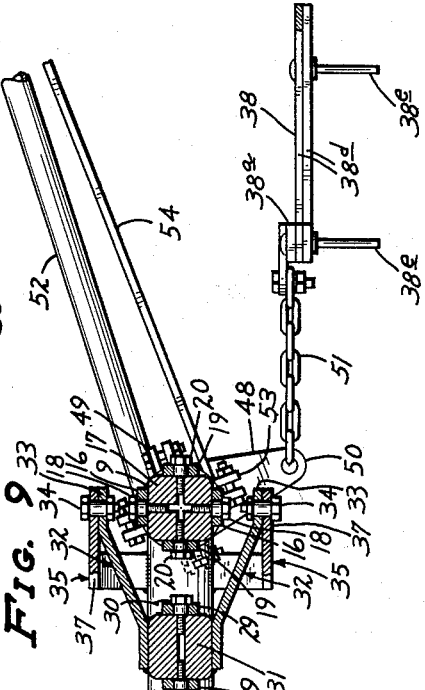
FIG. 9 is an enlarged view in vertical section taken on the line 9—9 of FIG. 2, some parts being broken away.

The implement transport of this invention further comprises a pair of opposite end sections, each of which is represented generally by the reference numeral 13. The end sections 13 are pivotally connected, by novel pivotal connection means described hereinafter, each one on an opposite side of the center section 1, as shown particularly in FIGS. 1 and 2. Since the opposite end sections 13 are similarly constructed and positioned relative to the center section 1, only one thereof will be described in detail hereinafter. Each of the end sections 13 comprises an elongated tubular generally horizontally extending implement-carrying boom 14 pivotally connected by means of a universal joint at its inner end portion 15 to the adjacent outer end portion 12 of the shaft 11 of the center section 1. As shown particularly in FIGS. 1–3 and 9, the universal joint which is a part of the above-noted pivotal connection means and which connects the inner end portion 15 of the boom 14 to the adjacent outer end portion 12 of the shaft 11 comprises a pair of outer bars 16 rigidly secured to the inner end portion 15 of the booms 14 and also pivotally secured to a joint block 17 by means of shoulder screws 18. The universal joint also comprises a pair of inner bars 19 rigidly secured to the adjacent outer end portion 12 of the shaft 11 and pivotally secured to said joint block 17 by means of shoulder screws 20. It will be seen that the boom 14 is thereby coupled to the shaft 11 of the center section 1 for rotation therewith about their own axes, and the boom 14 is also adapted for generally horizontally directed swinging movement between an operative position in general axial alignment with the shaft 11 of the center section 1, as shown by full lines in FIG. 1, and an inoperative trailing position with respect to the center section 1, as shown by dotted lines in FIG. 1. It is noted that the boom 14 is also adapted for limited generally vertically directed movement in response to changes in the contour of the ground, as will be more specifically pointed out hereinafter.

Figure 8:
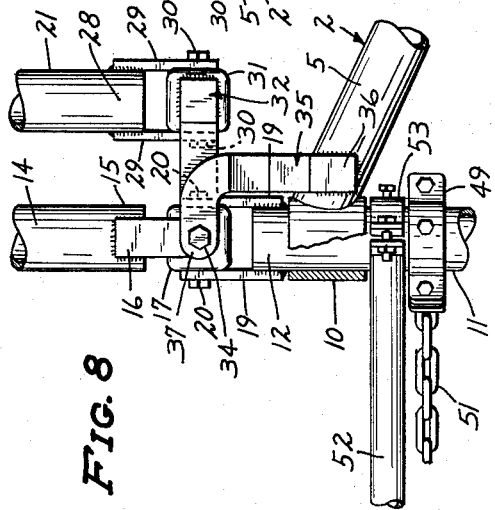
FIG. 8 is an enlarged fragmentary view in top plan.

Each of the end sections 13 further comprises an elongated generally horizontally disposed tubular boom-supporting stabilizer leg 21 disposed in forwardly spaced but generally parallel relationship with its adjacent boom 14. The stabilizer leg 21 is provided at its outer end portion 22 with an angularly disposed suspension arm 23 to which is pivotally secured a fork assembly 24 for carrying a caster wheel 25. The stabilizer leg 21 is also provided at its outer end portion 22 with a bearing sleeve 26 secured in rearwardly spaced relationship thereto by means of a suitable bracket 27. The inner end portion 28 of the stabilizer leg 21 is pivotally connected for movement about the generally vertical axis of pivotal connection of the boom 14 to the center section 1 whereby the stabilizer leg 21 is adapted for movement with its adjacent boom 14 between the above noted operative and inoperative positions thereof. The inner end portion 28 of the stabilizer leg 21 is also pivotally connected for limited generally vertically directed movement with its associated boom 14 whereby to follow the contour of the ground. The above referred to pivotal connection of the stabilizer leg 21 may be considered to be a part of the above-noted pivotal connection means and the same is accomplished by a novel arrangement, which is shown particularly in FIGS. 8 and 9, and which comprises a pair of outer bars 29 rigidly secured to the inner end portion 28 of the stabilizer leg 21 and pivotally secured by means of shoulder screws 30 to a block element 31. A pair of vertically spaced angle bars 32 are rigidly secured at their more closely spaced end portions to the upper and lower faces of the block element 31, as shown particularly in FIGS. 8 and 9, and the more widely spaced end portions 33 thereof are pivotally connected by means of shoulder bolts 34 to a pair of generally vertically spaced hook bars 35. It is noted that the inner end portions 36 of the hook bars 35 are rigidly secured to the rearward end portions of the adjacent one of the side frame members 4, 5 of the center section 1. With this arrangement, and as shown in the drawings, the pivotal connection between the outer end portions 37 of the hook bars 35 and the angle bars 32 is coaxial with the axis of pivotal connection between the boom 14 and the shaft 11 of the center section 1 so as to permit movement of the stabilizer leg 21 with its associated boom 14 between the above noted operative and trailing positions thereof.

As noted above, the implement transport described herein is adapted for arrangement in a novel manner with a plurality of transversely spaced implement sections, an example being a plurality of harrow sections 38, as shown in the drawings. The harrow sections 38 each comprises a forward frame bar 38a, an intermediate frame bar 38b, a rear frame bar 38c, a plurality of angle frame bars 38d, and a plurality of depending tines 38e. The harrow sections 38 are disposed with their forward frame bars 38a in rearwardly spaced relationship to the shaft 11 of the center section 1 and the booms 14 of the end sections 13 when the same are in their transversely aligned positions. The harrow sections 38 are connected and secured to the shaft 11 and the booms 14 by a novel arrangement which will be described hereinafter.

In accordance with this invention, the shaft 11 of the center section 1 and the booms 14 of the opposite end sections 13 are connected together and mounted for rotation about their own axes, and as shown particularly in FIG. 4, power means is provided for imparting said rotation about their own axes to the shaft 11 and the booms 14, whereby to raise and lower the harrow sections 38 carried thereby. As shown, said power means comprises a fluid pressure operated cylinder 40 pivotally connected at its forward end portion to a mounting sleeve 41 adjustably positioned on the center frame member 3 of the rigid frame structure 2 of the center section 1 and rigidly securable in various longitudinal positions with respect thereto by means of a set screw 42. A pair of generally upstanding lever arms 43 are rigidly secured at their radially inner end portions in axially spaced relationship on the shaft 11 of the center section 1. An elongated piston element 45 has one end portion thereof operatively coupled with the fluid pressure cylinder 40 and its other end portion pivotally connected by means of a T-joint 46 to the radially outer end portions 47 of the lever arms 43. With this arrangement, extension of the piston elements 45 by the fluid pressure cylinder 40 will move the harrow sections 38 carried by the shaft 11 and the booms 14 to the lower ground-engaging full line position of FIG. 4, and retraction of the piston element 45 will move the harrow sections 38 to the upper dotted line position thereof shown in FIG. 4. The adjustable securement of the mounting sleeve 41 to the longitudinal member 3 of the center section 1 provides means for adjusting the operation of the fluid pressure cylinder 40 and the relative upper and lower positions of the harrow sections 38.

As noted above, novel means for supporting and controlling the harrow implement sections 38 is provided in accordance with this invention, the same comprising a plurality of relatively short lower arms 48 securely but adjustably fastened by means of clamping brackets 49 in axially spaced relationship on the shaft 11 of the center section 1 and the booms 14 of the end sections 13. The lower arms 48 are disposed in generally transverse alignment with one another and normally extend in a generally downward direction with respect to the shaft 11 and the booms 14 whereby to be in generally horizontal alignment with the forward frame bars 38a of the harrow sections 38. The lower end portions 50 of the lower arms 48 are each connected by means of short lengths of flexible chain 51 to the forward frame bars 38a of the harrow sections 38, as shown in the drawings. Also, a plurality of relatively long upper arms 52 are rigidly secured by means of clamping brackets 53 in spaced relationship on the shaft 11 of the center section 1 and the booms 14 of the end sections 12, the upper arms 52 also being in generally transverse alignment with one another. It is noted that the upper arms 52 normally extend generally upwardly and rearwardly in a generally radial direction with respect to the shaft 11 and the booms 14. The upper arms 52 are each provided with elongated brace rods 54 which are also secured to the brackets 53. The upper arms 52 are generally tubular in cross section and receive elongated extension rods 55 longitudinally adjustably secured therein by conventional pins and spaced apertures, as shown in the drawings. The upper end portion of each of the extension rods 55 is provided with a fork element 56 in which is pivotally mounted a sleeve 57. Also, a plurality of generally vertically disposed elongated pressure rods 58 are one each received in the sleeve 57 of a different one of the upper arms 52 for reciprocatory movement with respect thereto. The upper end portions of each of the pressure rods 58 is provided with a transversely extending stop pin 59 and the lower end portion of each of the pressure rods 58 is pivotally secured by means of a pivot bracket 60 to the intermediate frame bar 38b of the adjacent harrow section 38, as shown particularly in FIGS. 1 and 4. In accordance with this invention, spring means is associated with each of the pressure rods 58 and biases the adjacent harrow sections 38 in a generally downward ground-engaging direction, said spring means comprising an elongated spring 61 co-axially received on each of the pressure rods 58 and interposed between the lower end portion thereof and the mounting sleeve 57 thereof.

The above described supporting and controlling means for the harrow implement sections 38 is not only particularly adapted and adjustable to provide satisfactory ground-working harrow action with respect to various conditions of mellow and hard soil, but is also adapted to permit obstructions to pass thereby. An important feature of this arrangement is that a generally straight forward pull is continually exerted by the lower arms 48 on the forward frame bars 38a of the harrow sections 38, so as to provide the desired pressure of the harrow sections 38 upon the soil. As shown in the drawings, FIG. 4 shows the said novel supporting and controlling means for the harrow sections 38 in the position thereof necessary to impart pressure upon the harrow sections 38 when the harrow sections 38 are working the soil. In this regard, an advantage of this invention resides in the fact that the pressure applied to the harrow sections 38 by the pressure rods 58 may be increased or decreased by actuation of the fluid cylinder 40 and thereby balanced so as to afford the desired harrow action and also permit obstructions to pass below the harrow sections 38, and this is illustrated particularly in FIGS. 5 and 6 of the drawings. Of course, the above referred to adjustment of the extension rods 55 provides means for matching the harrow or other implement action with the soil condition.

After the harrow sections 38 have been moved by means of the power means, including the fluid pressure operated cylinder 40 described above, to their upper position shown by dotted lines in FIG. 4, the opposite end sections 13 of this invention are adapted for generally horizontally directed swinging movements from their operative positions in general transverse alignment with one another, as shown by full lines in FIG. 1, to the inoperative transporting or trailing positions thereof shown by dotted lines in FIG. 1. It is also noted that the opposite end sections are adapted, by virtue of the above noted arrangement in connection thereof with the center section 1, to move in limited generally vertical directions so as to permit the same with heretofore unknown efficiency over uneven ground.

For the purpose of holding the opposite end sections 13 in their above described operative positions with respect to the center section 1, releasable means is connected between the forward portion of the frame structure 2 of the center section 1 and the outer end portions 22 of the stabilizer legs 21 of the opposite end sections 13, said means comprising a pair of elongated cables 62 connected at their outer end portions to suitable brackets 63 secured to the outer end portions 22 of the stabilizer legs 21, and removably secured by means of coupling elements 64 to a wing bracket 65 rigidly secured to the forward end portion of the longitudinal frame member 3 of the center section 1. With this arrangement, when it is desired to move the opposite end sections 13 to their above noted trailing positions shown by dotted lines in FIG. 4, after the harrow sections 38 have been moved by means of the fluid pressure operated cylinder 40 to their above described upper positions shown by dotted lines in FIG. 4, the towing vehicle, not shown, is backed up so as to release the tension on the cables 62. Then the pins 66 are removed from the coupling element 64 so as to release the cables 62 and thereafter upon further forward movement of the implement and transport, the opposite end sections 13 automatically swing about the center section 1 and move to the above described trailing positions thereof.

Although this invention has been described and shown in connection with spike-tooth harrow, it should be understood that the same may be used with equal effectiveness in connection with other types of drawn implements, including various types of harrows, such as spring-tooth and rotary harrows.

It is believed that the operation of this invention has been sufficiently set forth in the above description thereof. This invention has been thoroughly tested and found to be completely satisfactory for the accomplishment of the above objects; and while I have shown and described a preferred embodiment thereof, I wish it to be specifically understood that the same is capable of modification without departure from the scope and spirit of the appended claims.

What I claim is:
1. An implement transport for use in connection with a towing vehicle, said implement transport comprising:
  (a) a center section comprising:
    (1) rigid frame structure having wheel carriage means and adapted for connection to the towing vehicle,
    (2) an elongated implement-carrying shaft extending generally transversely with respect to the normal direction of travel of said vehicle and said transport and journalled in said frame structure for rotation about its own axis,
  (b) a pair of opposite end sections one each disposed generally on an opposite side of said center section, said end sections each comprising:
    (1) an elongated implement-carrying boom rotatable about its own axis,
    (2) an elongated boom supporting stabilizer leg disposed in general parallelism with said boom, said stabilizer leg including means for journalling said boom,
    (3) a caster wheel suspended and secured to the outer end portion of said stabilizer leg,
  (c) pivotal connection means connecting each of said end sections to said center section for generally horizontally directed swinging movements between operative positions of said end sections in general transverse alignment with said center section and inoperative trailing positions of said end sections with respect to said center section and also for limited generally vertically directed movements of said end sections in response to changes in the ground contour, said pivotal connection means for each of said end sections comprising:
    (1) a universal joint connecting the inner end portion of said rotatable boom of the end section to the adjacent outer end portion of the shaft of said center section, and
    (2) mechanism connecting the inner end portion of the stabilizer leg of the end section to said center section for movements about the axis of pivotal connection of said boom to said center section and for generally vertically directed movements whereby to permit said horizontally directed swinging movement and said limited generally vertically directed movement of said end sections, (d) power means for imparting said rotation about their own axes to said shaft of said center section and said booms of said end sections whereby to raise and lower the implements carried thereby, and (e) releasable means for holding said end sections in their said operative positions.

2. An implement transport for use in connection with a towing vehicle, said implement transport comprising:

(a) a center section comprising:
  (1) rigid frame structure having wheel carriage means and adapted for connection to the towing vehicle,
  (2) said frame structure including bearing means the axis of which extends generally transversely with respect to the normal direction of travel of said vehicle and said transport,
  (3) an elongated implement-carrying shaft journalled for rotation about its own axis in said bearing means, (b) a pair of opposite end sections pivotally connected one each disposed generally at an opposite side of said center section, said end sections each comprising:
  (1) an elongated implement-carrying boom rotatable about its own axis,
  (2) an elongated boom supporting stabilizer leg disposed in forwardly spaced but generally parallel relationship with said boom, said stabilizer leg including bearing means for mounting said boom,
  (3) a caster wheel suspended and secured to the outer end portion of said stabilizer leg, (c) pivotal connection means connecting each of said end sections to said center section for generally horizontally directed swinging movements between operative positions of said end sections in general transverse alignment with said center section and inoperative trailing positions of said end sections with respect to said center section and also for limited generally vertically directed movement of said end sections in response to changes in the ground contour, said pivotal connection means for each of said end sections comprising:
  (1) a universal joint connecting the inner end portion of said rotatable boom of the end section to the adjacent outer end portion of the shaft of said center sections, and
  (2) mechanism connecting the inner end portion of the stabilizer leg of the end section to said center section for movements about the axis of pivotal connection of said boom to said center section and for generally vertically directed movements whereby to permit said horizontally directed swinging movement and said limited generally vertically directed movement of said end sections, (d) power means for imparting said rotation about their own axes to said shaft of said center section and said booms of said end sections whereby to raise and lower the implements carried thereby, and (e) releasable means for holding said end sections in their said operative positions.

3. An implement transport for use in connection with a towing vehicle, said implement transport comprising:

(a) a center section comprising:
  (1) a rigid frame structure having a forward portion adapted for removable connection to the towing vehicle,
  (2) said frame structure including bearing means disposed generally at the rearward portion thereof, the axis of said bearing means extending generally transversely with respect to the normal direction of travel of said implement and said transport,
  (3) an elongated generally horizontally extending implement-carrying shaft journalled for rotation about its own axis in said bearing means,
  (4) wheel carriage means supporting said frame structure and disposed generally intermediate the forward portion thereof and the rearward portion thereof, (b) a pair of opposite end sections pivotally connected one each disposed generally at an opposite side of said center section, said end sections each comprising:
  (1) an elongated generally horizontally extending implement-carrying boom rotatable about its own axis,
  (2) an elongated boom supporting stabilizer leg disposed in forwardly spaced but generally parallel relationship with said boom, said stabilizer leg including bearing means for mounting said boom,
  (3) a caster wheel suspended and secured to the outer end portion of said stabilizer leg, (c) pivotal connection means connecting each of said end sections to said center section for generally horizontally directed swinging movements between operative positions of said end sections in general transverse alignment with said center section and inoperative trailing positions of said end sections with respect to said center section and also for limited generally vertically directed movement of said end sections in response to changes in the ground contour, said pivotal connection means for each of said end sections comprising:
  (1) a universal joint connecting the inner end portion of said rotatable boom of the end section to the adjacent outer end portion of the shaft of said center section, and
  (2) mechanism connecting the inner end portion of the stabilizer leg of the end section to said center section for movemetns about the axis of pivotal connection of said boom to said center section and for generally vertically directed movements whereby to permit said horizontally directed swinging movement and said limited generally vertically directed movement of said end sections, (d) power means for imparting said rotation about their own axes to said shaft of said center section and the booms of said end sections whereby to raise and lower the implements carried thereby, said power means comprising:
  (1) a fluid pressure operated cylinder pivotally connected to the frame structure of said center section,
  (2) a lever arm rigidly secured to said shaft of the center section and extending generally radially with respect thereto, and
  (3) a piston element having one end portion thereof operatively coupled to said cylinder and the other end portion pivotally connected to the radially outer end portion of said lever arms, and (e) releasable means connected between the forward portion of the frame structure of the center section and the outer end portions of said stabilizer legs of said end sections for holding said end sections in their said operative positions.

4. An implement and transport therefor for use in connection with a towing vehicle, said implement transport comprising:
 (a) a center section comprising:
  (1) rigid frame structure having wheel carriage means and adapted for connection to the townig vehicle,
  (2) an elongated implement-carrying shaft extending generally transversely with respect to the normal direction of travel of said implement and said transport and journalled in said frame structure for rotation about its own axis,
 (b) a pair of opposite end sections one each disposed generally at an opposite side of said center section, said end sections each comprising:
  (1) an elongated implement-carrying boom rotatable about its own axis,
  (2) an elongated boom supporting stabilizer leg disposed in general parallelism with said boom, said stabilizer leg including means for journalling said boom,
  (3) a caster wheel suspended and secured to the outer end portion of said stabilizer leg,
 (c) a plurality of harrow implement sections carried by said shaft and said booms,
 (d) pivotal connection means connecting each of said end sections to said center section for generally horizontally directed swinging movements between operative positions of said end sections in general transverse alignment with said center section and inoperative trailing positions of said end sections with respect to said center section and also for limited generally vertically directed movements of said end sections in response to changes in the ground contour,
 (e) said shaft of said center section and said booms of said end sections being rotatable to move the implements carried thereby between lower ground-engaging positions and upper generally vertically extending positions,
 (f) means for supporting and controlling said harrow implement sections, said means being connected between said harrow sections and said shaft and said booms and said means being operative upon rotation of said shaft and said booms whereby to increase or decrease the downwardly directed pressure on said harrow sections when said harrow sections are in their lower ground-engaging positions.
 (g) power means for imparting said rotation about their own axes to said shaft of said center section and said booms of said end sections, and
 (h) releasable means for holding said end sections in their said operative positions.

5. An implement and transport therefor for use in connection with a towing vehicle, said implement transport comprising:
 (a) a center section comprising:
  (1) rigid frame structure having wheel carriage means and adapted for connection to the towing vehicle,
  (2) an elongated implement-carrying shaft extending generally transversely with respect to the normal direction of travel of said implement and said transport and journalled in said frame structure for rotation about its own axis,
 (b) a pair of opposite end sections one each disposed generally at an opposite side of said center section, said end sections each comprising:
  (1) an elongated implement-carrying boom rotatable about its own axis,
  (2) an elongated boom supporting stabilizer leg disposed in general parallelism with said boom, said stabilizer leg including means for journalling said boom,
  (3) a caster wheel suspended and secured to the outer end portion of said stabilizer leg,
 (c) a plurality of harrow implement sections carried by said shaft and said booms,
 (d) pivotal connection means connecting each of said end sections to said center section for generally horizontally directed swinging movements between operative positions of said end sections in general transverse alignment with said center section and inoperative trailing positions of said end sections with respect to said center section and also for limited generally vertically directed movements of said end sections in response to changes in the ground contour,
 (e) said shaft of said center section and said booms of said end sections being rotatable to move the implements carried thereby between lower ground-engaging positions and upper generally vertically extending positions,
 (f) means for supporting and controlling said harrow implement sections, said means comprising:
  (1) a plurality of flexible connectors secured to the forward portions of said harrow sections and also secured in axially spaced relationship on said shaft of said center section and said booms of said end sections,
  (2) a plurality of upper arms rigidly secured in spaced relation on said shaft of said center section and said booms of said end sections and in general transverse alignment with one another, said upper arms normally extending generally upwardly and rearwardly in a generally radical direction with respect to said shaft and said booms,
  (3) a plurality of generally vertically disposed pressure rods one each mounted on the outer end portion of a different one of said upper arms for reciprocatory movements with respect thereto, the lower ends of said pressure rods being pivotally secured to said harrow sections rearwardly of said forward portions thereof,
  (4) spring means associated with said pressure rods and biasing said harrow sections in a generally downward ground-engaging direction,
  (5) said pressure rods being arranged relative to said upper arms so as to permit movement of the harrow sections over protruding obstructions against the downward bias of said spring means,
 (g) power means for imparting said rotation about their own axes to said shaft of said center section and said booms of said end sections, and
 (h) releasable means for holding said end sections in their said operative positions.

6. An implement and transport therefor for use in connection with a towing vehicle, said implement transport comprising:
 (a) a center section comprising:
  (1) rigid frame structure having wheel carriage means and adapted for connection to the towing vehicle,
  (2) an elongated implement-carrying shaft extending generally transversely with respect to the normal direction of travel of said implement and said transport and journalled in said frame structure for rotation about its own axis.
 (b) a pair of opposite end sections one each disposed generally at an opposite side of said center section, said end sections each comprising:
  (1) an elongated implement-carrying boom rotatable about its own axis,
  (2) an elongated boom supporting stabilizer leg disposed in general parallelism with said boom, said stabilizer leg including means for journalling said boom,
  (3) a caster wheel suspended and secured to the outer end portion of said stabilizer leg,
 (c) a plurality of harrow implement sections carried by said shaft and said booms, (d) pivotal connection means connecting each of said end sections to said center section for generally horizontally directed swinging movements between operative positions of said end sections in general transverse alignment with said center section and inoperative trailing positions of said end sections with respect to said center section and also for limited generally vertically directed movements of said end sections in response to changes in the ground contour, (e) means for supporting and controlling said harrow implement sections, said means comprising:

(1) a plurality of flexible connectors secured to the forward portions of said harrow sections and also secured in axially spaced relationship on said shaft of said center section and said booms of said end sections (2) a plurality of relatively long upper arms rigidly secured in spaced relation on said shaft of said center section and said booms of said end sections and in general transverse alignment with one another, said upper arms normally extending generally upwardly and rearwardly in a generally radial direction with respect to said shaft and said booms, (3) a plurality of generally vertically disposed pressure rods one each mounted on the outer end portion of a different one of said upper arms for reciprocatory movements with respect thereto, the lower ends of said pressure rods being pivotally secured to said harrow sections rearwardly of said forward portions thereof, (4) spring means associated with said pressure rods and biasing said harrow sections in a generally downward ground-engaging direction, (5) said pressure rods being arranged relative to said upper arms so as to permit movement of the harrow sections over protruding obstructions against the downward bias of said spring means, (f) said shaft of said center section and said booms of said end sections being rotatable to move the implements carried thereby between lower ground-engaging positions and upper generally vertically extending positions and also being rotatable to increase or decrease the downwardly directed pressure of said pressure rods on the harrow sections when said harrow sections are in their lower ground-engaging positions, (g) power means for imparting said rotation about their own axes to said shaft of said center section and said booms of said end sections, and (h) releasable means for holding said end sections in their said operative positions.

References Cited in the file of this patent

UNITED STATES PATENTS

| | | |
|---|---|---|
| 1,927,458 | Klise | Sept. 19, 1933 |
| 2,828,597 | Moore | Apr. 1, 1958 |
| 2,944,615 | Clark | July 12, 1960 |
| 2,970,658 | Kopaska | Feb. 7, 1961 |

FOREIGN PATENTS

| | | |
|---|---|---|
| 885,629 | Germany | Aug. 6, 1953 |